(12) United States Patent
Ueno

(10) Patent No.: US 7,039,242 B2
(45) Date of Patent: May 2, 2006

(54) IMAGE PROCESSING DEVICE AND IMAGE PROCESSING METHOD

(75) Inventor: Akira Ueno, Akiruno (JP)

(73) Assignee: Olympus Corporation, Tokyo (JP)

( * ) Notice: Subject to any disclaimer, the term of this patent is extended or adjusted under 35 U.S.C. 154(b) by 702 days.

(21) Appl. No.: 10/292,914

(22) Filed: Nov. 12, 2002

(65) Prior Publication Data

US 2003/0123741 A1    Jul. 3, 2003

(30) Foreign Application Priority Data

Nov. 14, 2001  (JP)  ............................. 2001-349209
Nov. 8, 2002   (JP)  ............................. 2002-325493

(51) Int. Cl.
G06K 9/00    (2006.01)
H04B 1/66    (2006.01)

(52) U.S. Cl. ...................... 382/232; 375/240
(58) Field of Classification Search ................ 382/232; 375/240
See application file for complete search history.

(56) References Cited

U.S. PATENT DOCUMENTS 5,949,912 A * 9/1999 Wu ............................ 382/246
6,078,615 A * 6/2000 Yamamoto et al. ......... 375/240
6,212,300 B1 * 4/2001 Rengakuji ................... 382/232
6,229,926 B1 * 5/2001 Chui et al. .................. 382/240
6,307,966 B1 * 10/2001 Chapin ....................... 382/232
6,658,158 B1 * 12/2003 Fukuhara et al. ........... 382/240
6,671,418 B1 * 12/2003 Rengakuji et al. .......... 382/264

FOREIGN PATENT DOCUMENTS

JP    2000-312327    11/2000

* cited by examiner

Primary Examiner—Kanjibhai Patel
Assistant Examiner—O'Neal R. Mistry
(74) Attorney, Agent, or Firm—Straub and Pokotylo; John C. Pokotylo

(57) ABSTRACT

An image processing device includes an image processing part configured to process supplied image data, an image compression part configured to compress image data, a data supply part configured to sequentially supply the image data to the image processing part in a horizontal direction, the image data having a vertical data size defined by adding the size of peripheral data to an integer multiple of the vertical data size of a basic data size, a setting part configured to set the processing operations of the image processing part and image compression part, a storage part configured to store the image data, which is obtained by causing the image processing part to process the image data, and a sending part configured to read out the image data, for each basic data size and sequentially send the data to the image compression part.

12 Claims, 12 Drawing Sheets

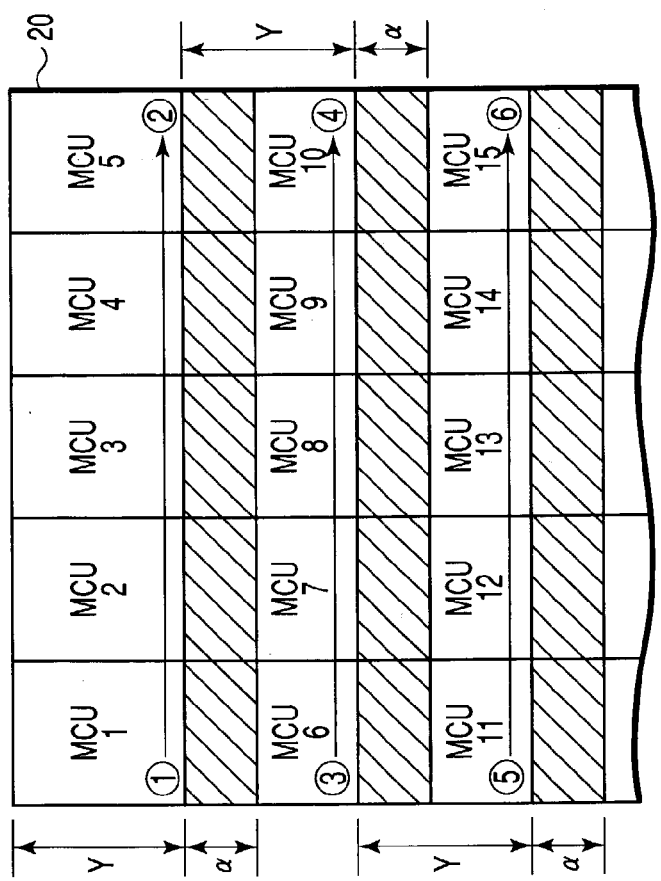
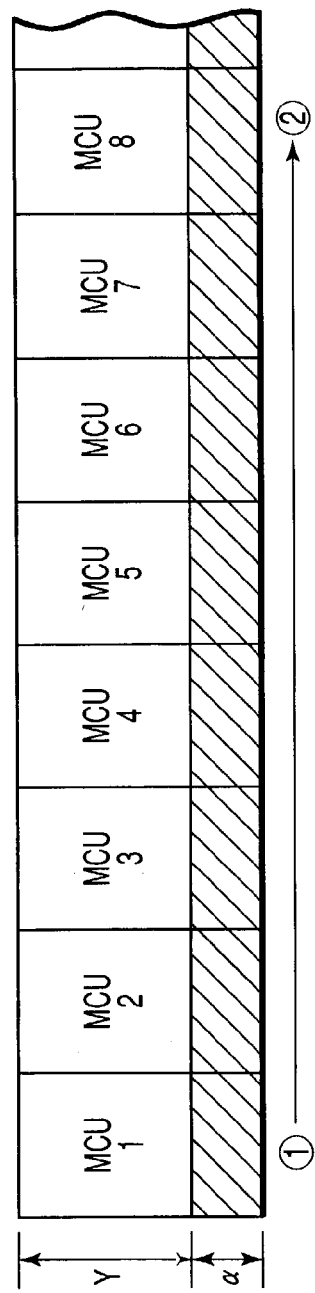
FIG. 4A
FIG. 4B

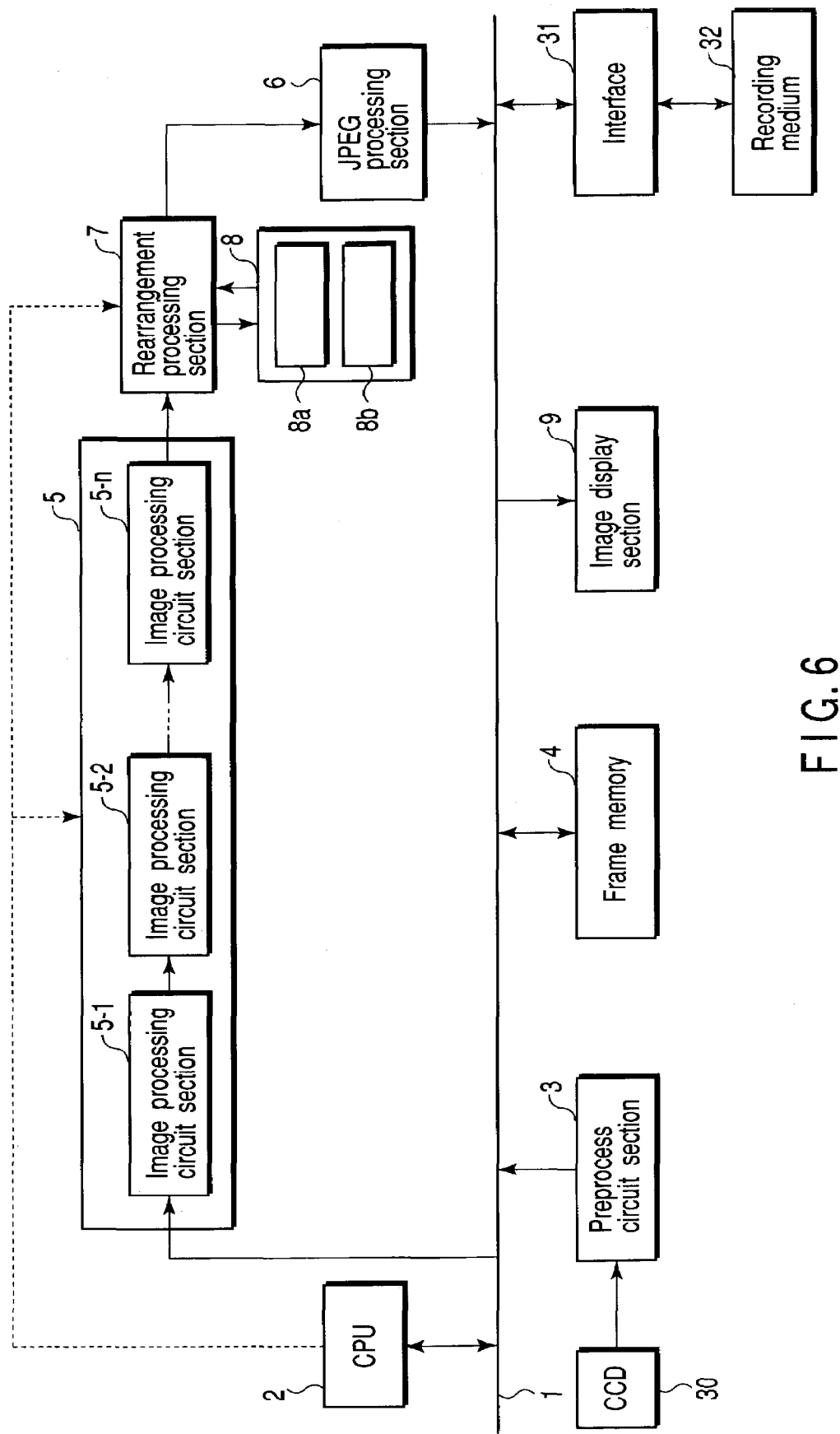
F I G. 6

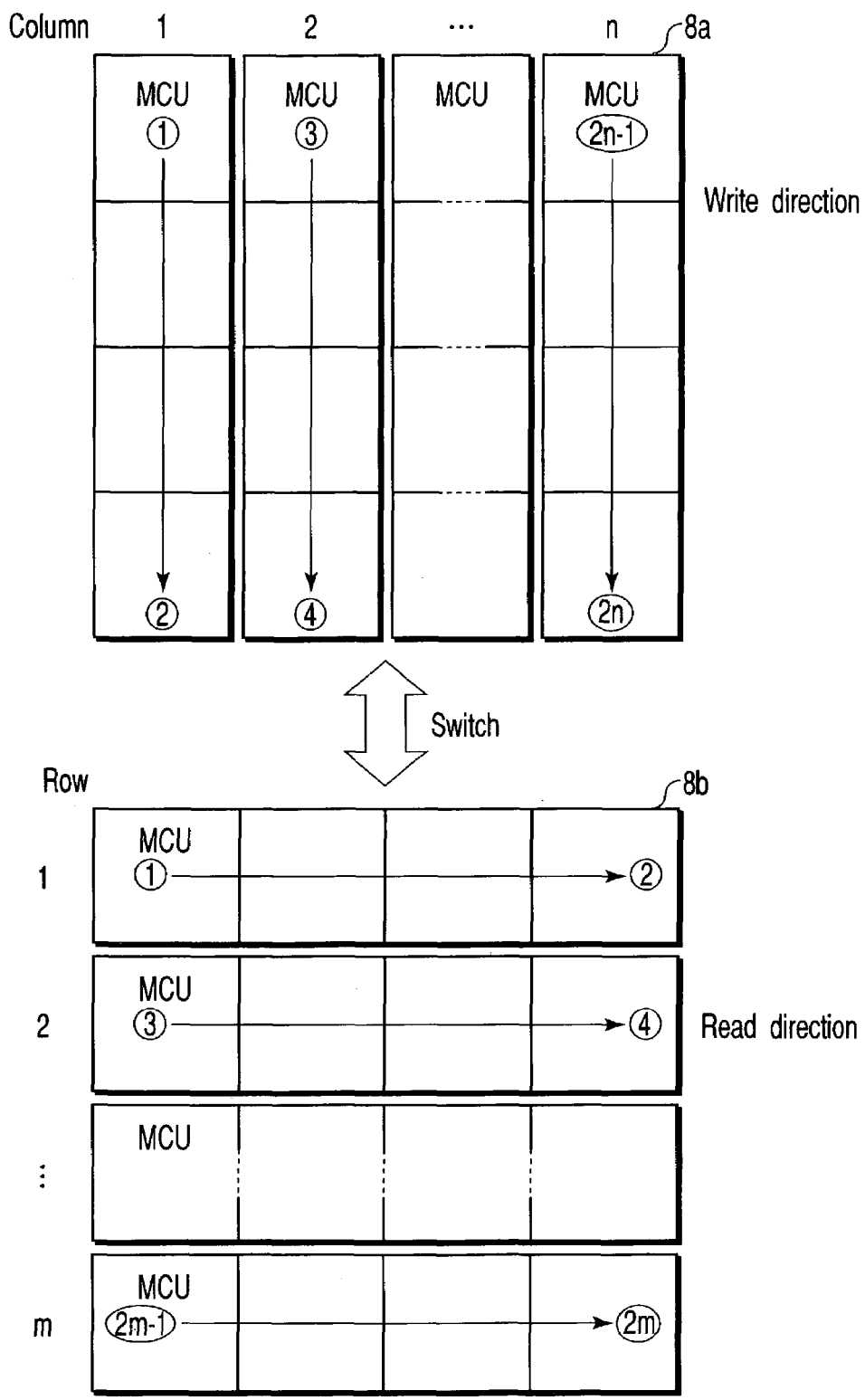
F I G. 9

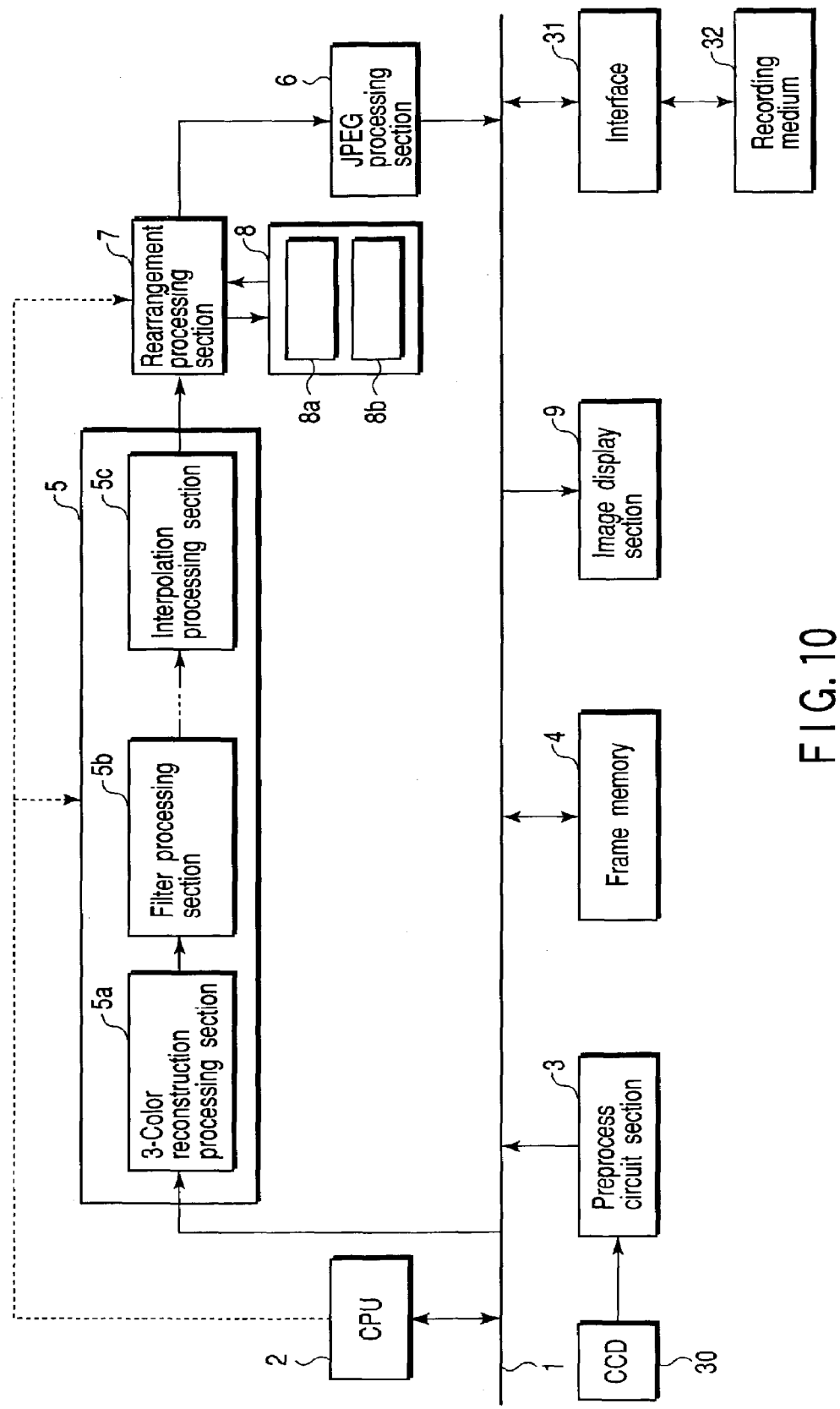
F I G. 10

IMAGE PROCESSING DEVICE AND IMAGE PROCESSING METHOD

CROSS-REFERENCE TO RELATED APPLICATIONS

This application is based upon and claims the benefit of priority from the prior Japanese Patent Applications No. 2001-349209, filed Nov. 14, 2001; and No. 2002-325493, filed Nov. 8, 2002, the entire contents of both of which are incorporated herein by reference.

BACKGROUND OF THE INVENTION

1. Field of the Invention

The present invention relates to an image processing device and image processing method used for a digital camera and the like.

2. Description of the Related Art

In recent years, the number of pixels of an image sensing element used in an image sensing device such as a digital camera is greatly increasing. The size of image data to be processed is also enormous. For this reason, a high-speed image processing device capable of shortening the time for image data processing is demanded.

As a technique for increasing the image data processing speed, a method using pipeline processing for image processing is known (Jpn. Pat. Appln. KOKAI Publication No. 2000-312327).

FIG. 1 is a block diagram showing the arrangement of a conventional image processing device.

A CPU 2 connected to a bus 1 causes a preprocess circuit section 3 to process an image sensing signal from a CCD image sensing element 30. The CPU 2 inputs the processed signal to an image processing section 5 through the bus 1. In the image processing section 5, image processing is performed as a pipeline scheme using a first image processing circuit section 5-1 to an nth image processing circuit section 5-n, which are connected in series. The image processing section 5 sends the processing result to a JPEG processing section 6. The JPEG processing section 6 compresses the image data by the JPEG scheme. The compressed image data is stored in a frame memory 4 through the bus 1 or recorded on a recording medium 32 such as a memory card through an interface 31.

According to this arrangement, data transfer through the bus 1 can be processed only by transfer from the frame memory 4 to the first image processing circuit section 5-1 and transfer from the JPEG processing section 6 to the frame memory 4. Hence, the data transfer size considerably decreases as compared to a conventional scheme that repeats data transfer between the frame memory 4 and each image processing circuit.

However, there is still a strong demand for higher-speed image data processing and shorter processing time in using the image processing device. To solve this problem, some conditions must be taken into consideration.

In the standard compression scheme, i.e., JPEG, processing such as compression is executed for each block called an MCU (Minimum Coded Unit). As an MCU, normally, 8×16 blocks, 16×16 blocks, or 8×8 blocks are used.

Hence, the image processing section 5 must segment image data into MCU blocks each having a predetermined size and transfer them to the JPEG processing section 6. In addition to this condition, the image processing section 5 must also transfer the segmented image data to the JPEG processing section 6 in a predetermined order. This condition is required to restore the data compressed by the JPEG processing section 6 to the original image data.

Even when an image recorded on a memory card or the like is to be read out and expanded by the JPEG processing section 6, higher-speed image data processing and shorter processing time are demanded.

Hence, to shorten the time of image data processing with compression or expansion in the image processing device, the above conditions must be satisfied, and the operation of the JPEG processing section 6 for compression or expansion must be guaranteed. Preferably, the measure taken has a form that does not change the operation of the JPEG processing section 6.

BRIEF SUMMARY OF THE INVENTION

An image processing device according to a first aspect of the present invention comprises an image processing part configured to process supplied image data, an image compression part configured to compress image data, which is obtained by the image processing part, a data supply part configured to sequentially supply the image data to the image processing part in a horizontal direction, the image data having a vertical data size defined by adding a size of peripheral data to an integer multiple of a vertical data size of a basic data size which is used as a basic unit data size in compression processing by the image compression part, a setting part configured to set processing operations of the image processing part and image compression part, thereby processing corresponding to the image data having the size supplied from the data supply part is executed, a storage part configured to store the image data, which is obtained by causing the image processing part to process the image data supplied by the data supply part in accordance with settings by the setting part, and a sending part configured to read out the image data, which is stored in the storage part, for each basic data size and sequentially send the data to the image compression part.

An image processing device according to a second aspect of the present invention comprises an image expansion part configured to expand compressed image data, an image processing part configured to process the expanded image data, a storage part configured to receive image data having a basic data size as a data size expanded by the image expansion part and store a plurality of image data before supplying the image data to the image processing part, a data supply part configured to read out, from the plurality of stored image data having the basic data size, image data having a vertical data size as an integer multiple of a vertical size of the basic data size and supply the image data to the image processing part, and a setting part configured to set processing operations of the image processing part, thereby processing corresponding to the data size supplied from the data supply part is executed.

An image processing method according to a third aspect of the present invention comprises an image processing step of causing an image processing part to process supplied image data, an image compression processing step of causing an image compression part to compress image data, which is obtained by the image processing part, a data supply step of causing a data supply part to sequentially supply image data to the image processing part in a horizontal direction, the image data having a vertical data size defined by further adding peripheral data to an integer multiple of a vertical data size of a basic data size which is used as a basic unit data size in compression processing by the image compression part, a setting step of causing a setting part to set processing operations of the image processing part and image compression part, thereby processing corresponding to the image data having the size supplied from the data supply part is executed, a storage step of causing a storage part to store the image data, which is obtained by causing the image processing part to process the image data supplied by the data supply part in accordance with settings in the setting step, and a sending step of causing a sending part to read out the image data, which is stored in the storage step, for each basic data size and sequentially send the data to the image compression part.

An image processing method according to a fourth aspect of the present invention comprises an image expansion step of causing an image expansion part to expand compressed image data, an image processing step of causing an image processing part connected in series to process the expanded image data, a storage step of causing a storage part to receive image data having a basic data size expanded in the image expansion step and store a plurality of image data before supplying the image data to the image processing part, a data supply step of causing a data supply part to read out, from the plurality of stored image data having the basic data size, image data having a vertical data size as an integer multiple of a vertical size of the basic data size and supply the image data to the image processing part, and a setting step of causing a setting part to set processing operation of the image processing part, thereby processing corresponding to the data size supplied from the data supply part is executed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention and, together with the general description given above and the detailed description of the embodiments given below, serve to explain the principles of the invention.

FIGS. 4A and 4B are views showing the image data transfer order by a conventional scheme;

FIG. 6 is a block diagram showing the arrangement of an image processing device according to the first embodiment of the present invention;

FIG. 9 is a view for explaining the read and write operations of a buffer memory;

FIG. 10 is a block diagram showing the arrangement of an image processing device according to the second embodiment of the present invention;

DETAILED DESCRIPTION OF THE INVENTION

A factor that prolongs the processing time of an image processing section 5 will be described first.

Figure 2:
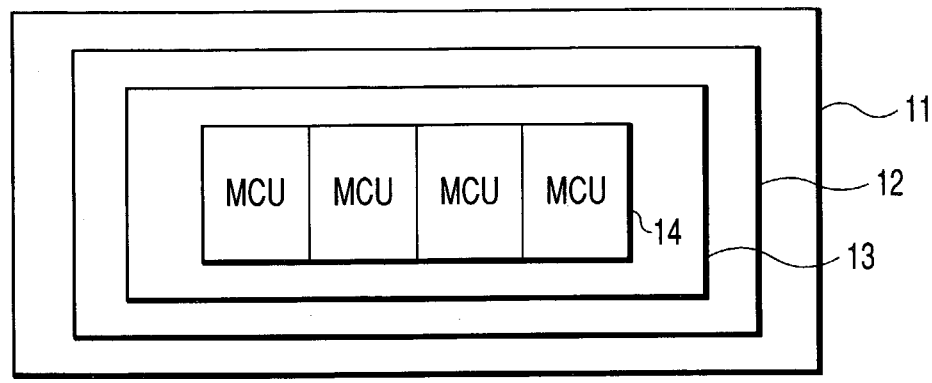
FIG. 2 is a view showing the size of data processed by an image processing section.

FIG. 2 is a view showing the size of data processed by the image processing section 5.

A data size 11 indicates the size of image data read out from a frame memory 4. This image data has a data size larger than a data size 14 input to a JPEG processing section 6 because of a reason to be described later. The image data size decreases to data sizes 12, . . . , 13 as the image data is sequentially processed by a first image processing circuit sections 5-1 to a final image processing circuit section 5-n in the image processing section 5.

The data size decreases because excess data is necessary for image processing. For example, to execute spatial filter processing by the image processing section 5, calculation must be performed using data of several points around data to be processed. After filter processing, the excess data is unnecessary and is removed.

Figure 3:
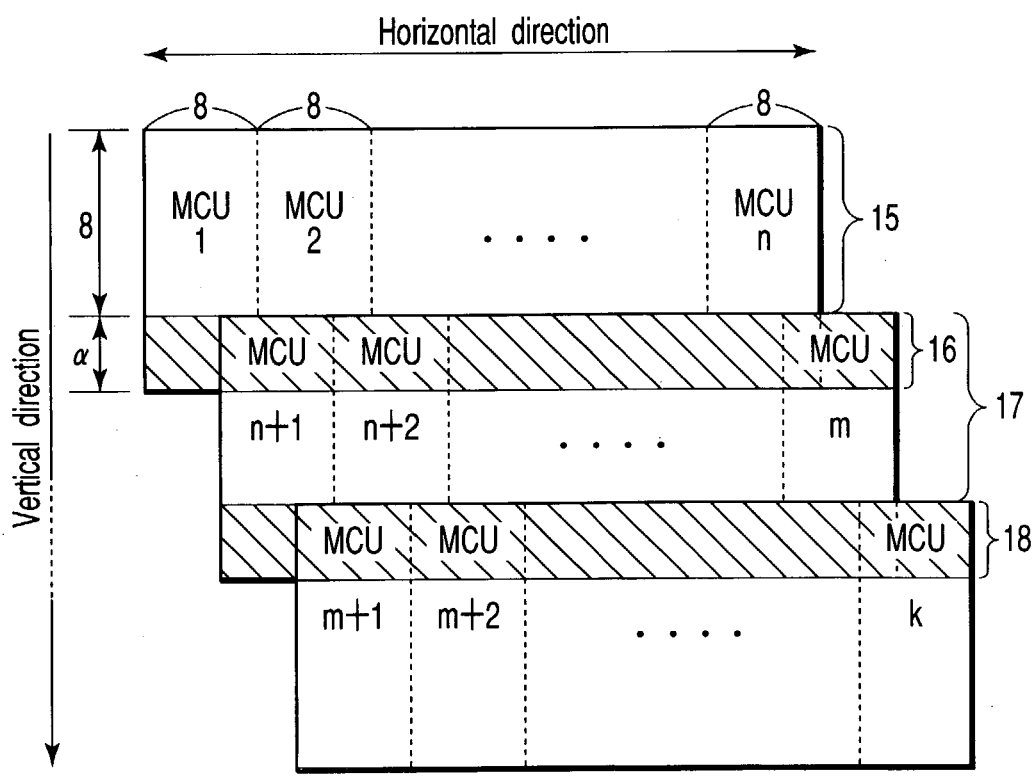
FIG. 3 is a view for explaining image data input and output states in the image processing section.

FIG. 3 is a view for explaining image data input and output states in the image processing section 5.

As described above, input data of the image processing section 5 is made of a data portion 15 formed from MCU blocks to be transferred to the JPEG processing section 6 and an excess data portion 16 which is necessary only for data processing. The size of the data portion 15 is 8×8n. The size of the excess data portion 16 is α×8n. Data that is input, next to the input data, to the image processing section 5 is also made of a data portion 17 formed from MCU blocks to be transferred to the JPEG processing section 6 and an excess data portion 18.

Data input to the image processing section 5 always has excess overlapping data. As a result, the larger the number of times of image data read from the frame memory 4 becomes, the more excess data transfer occurs.

Referring to FIG. 3, the arrangement direction of MCU1, MCU2, . . . , MCUn is defined as the horizontal direction of image data, and the arrangement direction perpendicular to it is defined as the vertical direction of image data.

FIGS. 4A and 4B are views showing the transfer order of image data 20 by a conventional scheme.

FIG. 4A shows a state wherein the image data 20 is segmented into MCU blocks. The MCU blocks are read out in the order of arrows shown in FIG. 4A, i.e., ①→②→③→④→ . . . using the (Y+α) pixel size in the vertical direction as a unit. Y indicates the vertical pixel size of one MCU block.

FIG. 4B shows the order of image data blocks flowing through the image processing section 5. The JPEG processing section 6 sequentially receives and compresses the blocks input in this order, i.e., ①→②→ . . . and then transfers the blocks to the frame memory 4.

To realize processing at a higher speed in the above-described current arrangement for processing, the present inventor gave prominence to the excess data portion.

An overlap size L in the vertical direction is defined by $$L = \alpha/(Y+\alpha) \quad (1)$$

where α is the vertical size of excess data that is necessary only for data processing, and Y is the vertical pixel size of one MCU block, as already described.

The overlap size L is an index representing the ratio of time consumed to process the excess data to the data processing time.

Hence, when the overlap size L can be decreased, the wasteful data processing time can be shortened, and almost only necessary data processing time can be set. For this reason, the processing speed can be increased.

The value α used in the overlap size L is determined as a constant when the processing method to be used by the image processing section 5 is determined. For example, if LPF (Low-Pass Filter) processing with six filter taps is to be executed, 5 is added to α. When LPF (Low-Pass Filter) processing with four filter taps is to be executed, 3 is added to α. According to equation (1), the overlap size L can be relatively decreased by using an image processing circuit with a small number of filter taps. However, this may not be able to satisfy a processing function at a necessary accuracy.

To prevent this, a scheme for relatively decreasing the overlap size L by increasing the number Y of pixels in the vertical direction is employed. More specifically, Y is set not to the size of one MCU block, as in the prior art, but to the size of a plurality of MCU blocks, i.e., an integer multiple of MCU size.

Figure 5A:
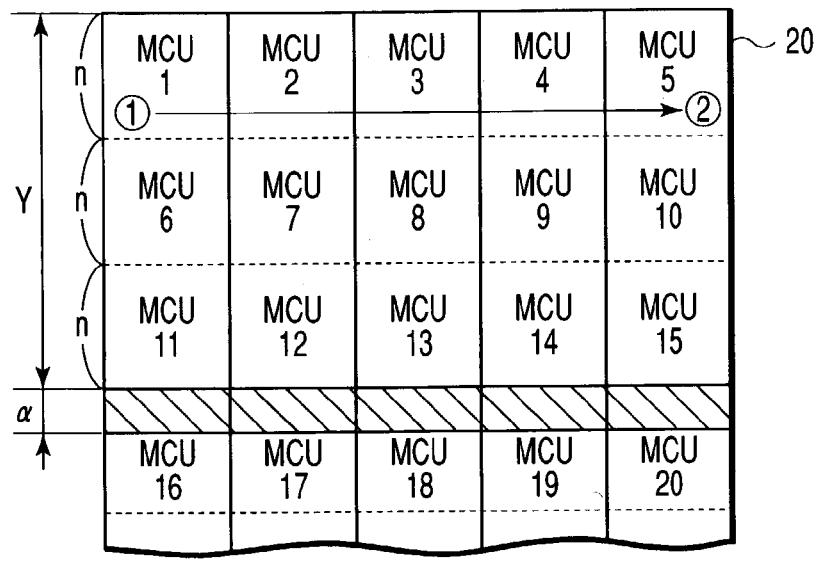
FIGS. 5A, 5B, and 5C are views showing the image data transfer order by the scheme of the present invention.
Figure 5B:
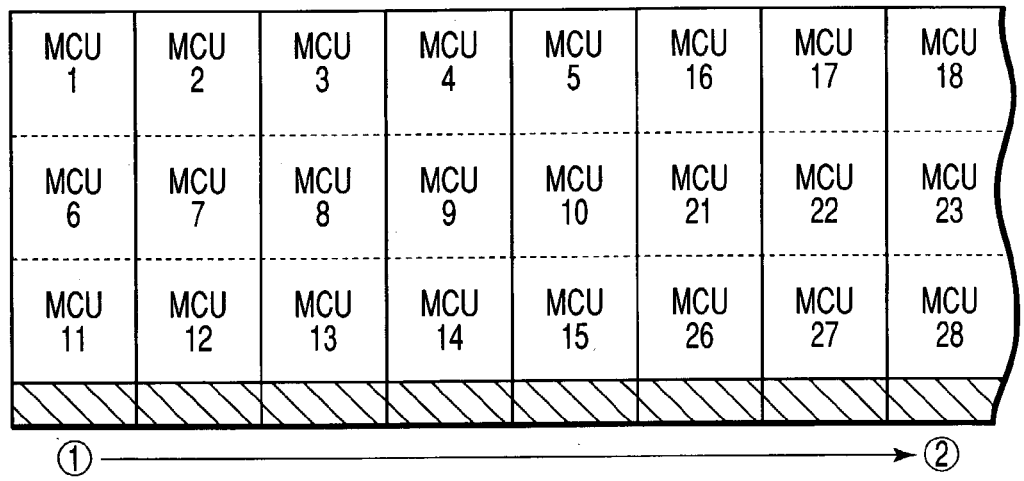
Figure 5C:
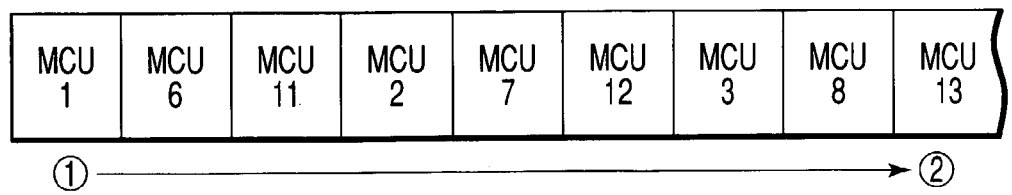

FIGS. 5A, 5B, and 5C are views showing the transfer order of the image data 20 by the scheme of the present invention.

FIG. 5A shows a state wherein the image data 20 is segmented into a plurality of MCU blocks all together. This scheme is different from the conventional segmenting method in that Y is set to a size corresponding to the number of pixels of a plurality of MCU blocks in the vertical direction. The data are read out in the order of arrows shown in FIG. 5A, i.e., ①→② ... using the (Y+α) pixel size in the vertical direction as a unit.

FIG. 5B shows the order of image data blocks input to the image processing section 5, i.e., the order ①→② .... FIG. 5C shows the order of MCU blocks of image data output from the image processing section 5. The JPEG processing section 6 compresses the MCU blocks input in this order, i.e., ①→② ... and transfers them to the frame memory 4.

When the scheme for transferring a plurality of blocks is used, the overlap size L can be reduced, and the processing speed can be increased. However, to employ this scheme, the following two points must be examined.

As the first point to be examined, the size of data transferred to the image processing section 5 becomes larger than before. However, the conventional arrangement of the image processing section 5 has an internal buffer with a capacity enough to cope with such an increase in data size. Hence, even when this scheme is employed, processing can be realized by a minor change without greatly modifying the hardware.

As the second point to be examined, the order of MCU blocks to be transferred is changed. When the transfer order changes, the order of image rearrangement changes. Hence, if an image rearranged in accordance with the conventional order is displayed on a monitor, an image like a jigsaw puzzle with disordered pieces is displayed.

The present invention has been made on the basis of the above examinations and studies.

FIG. 6 is a block diagram showing the arrangement of an image processing device according to the first embodiment of the present invention. The same reference numerals as in FIG. 1 denote the same parts in the first embodiment, and a detailed description thereof will be omitted.

Figure 1:
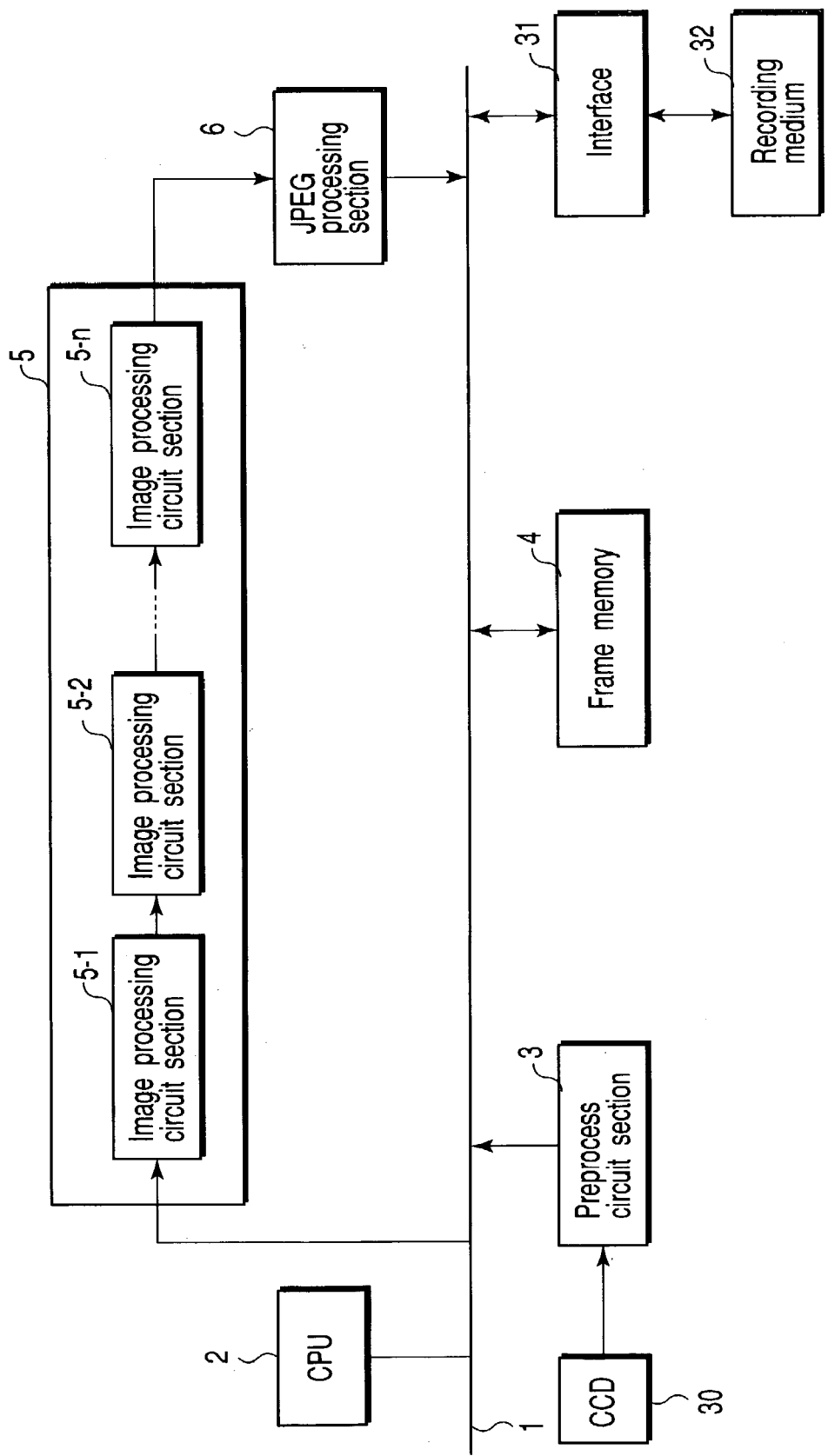
FIG. 1 is a block diagram showing the arrangement of a conventional image processing device.

The first embodiment is different from the arrangement shown in FIG. 1 in that a rearrangement processing section 7 and rearrangement buffer 8 are added, and an image display section 9 such as a liquid crystal monitor is explicitly illustrated. The rearrangement processing section 7 changes the order of image data to be transferred from an image processing section 5 to a JPEG processing section 6. The rearrangement buffer 8 is a work area for the rearrangement processing. The rearrangement buffer 8 has a first buffer memory 8a and second buffer memory 8b. An image data write or read is performed by switching between the first buffer memory 8a and the second buffer memory 8b.

A method of executing high-speed image processing in the image processing device with the above arrangement will be described.

Figure 7:
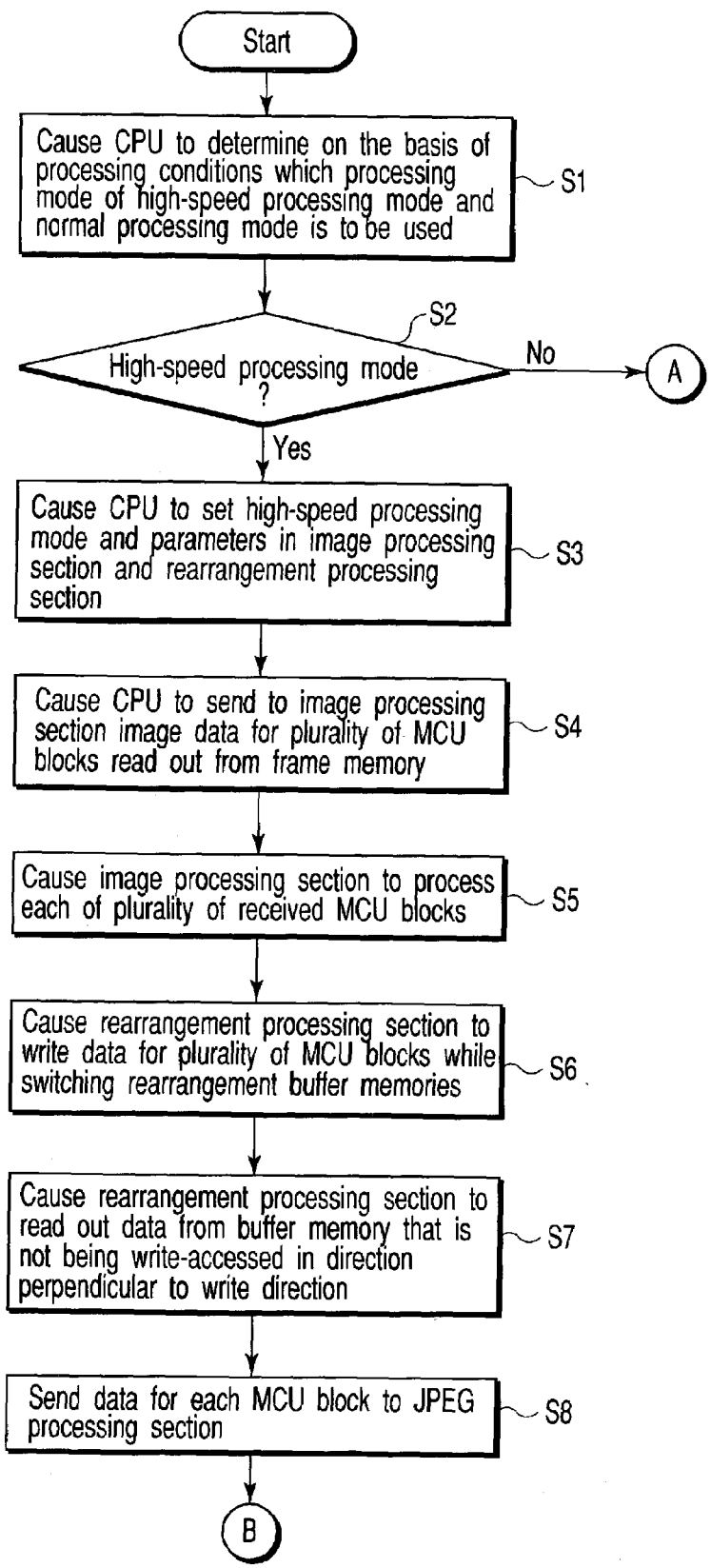
FIG. 7 is a flow chart showing the schematic procedure of image compression by the image processing device.
Figure 8:
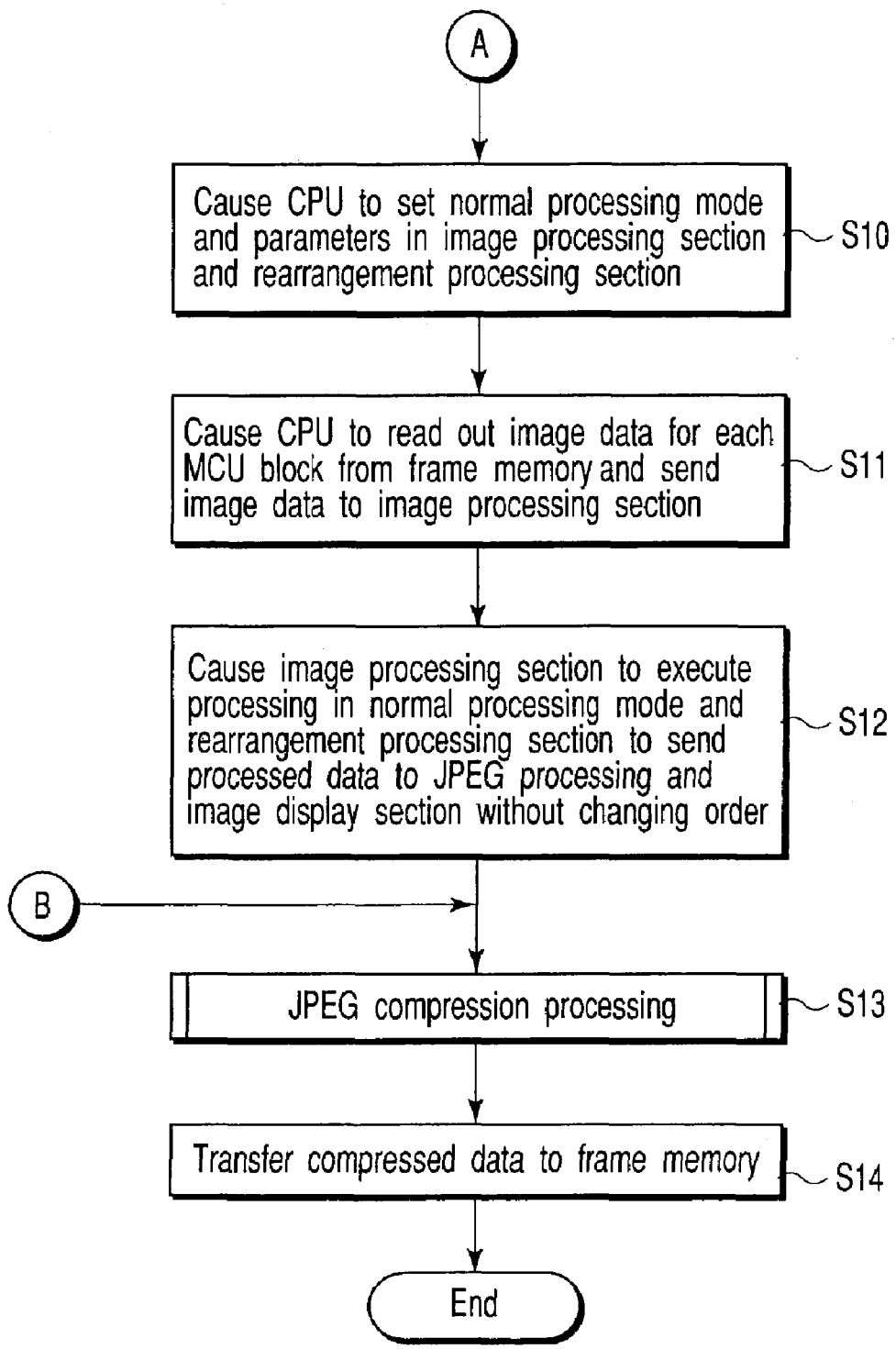
FIG. 8 is a flow chart showing the schematic procedure of image compression by the image processing device.

FIGS. 7 and 8 are flow charts showing the schematic procedure of image compression by the image processing device.

In step S1, on the basis of processing conditions including the size after compression and the image processing time, a CPU 2 determines which scheme should be used for processing: the above-described scheme (to be referred to as a "high-speed processing model" hereinafter) for transferring a plurality of MCU blocks or the scheme (to be referred to as a "normal processing mode" hereinafter) for sequentially transferring single MCU blocks.

If YES in step S2, i.e., processing should be executed in the high-speed processing mode, processing in step S3 is executed. In step S3, the CPU 2 sets, in the image processing section 5 and rearrangement processing section 7, a high-speed processing instruction and parameter values necessary for the high-speed processing mode. The parameters include, e.g., the number of MCU blocks to be transferred, the number of pixels to be transmitted, and the number of filter taps of the image processing circuit.

In step S4, the CPU 2 reads out image data from the frame memory 4 using a plurality of MCU blocks as a unit. The image data is transferred to the image processing section 5 together with excess data necessary only for image data processing.

Note that the image data supply operation may be realized by causing the CPU 2 and a DMA (Dynamic Memory Access) (not shown) provided on the input side of the image processing section 5 to cooperate with each other.

In step S5, image processing circuit sections 5-1, ..., 5-n at the respective stages process the transferred image data of the plurality of MCU blocks in accordance with the parameter values indicated by the CPU 2 in advance.

In step S6, the rearrangement processing section 7 alternately writes in the memories 8a and 8b of the rearrangement buffer 8 the plurality of MCU blocks in the image data processed by the final image processing circuit sections 5-n. In step S7, the rearrangement processing section 7 reads out the data written in the buffer memory 8b (8a) different from the write-accessed buffer memory 8a (8b) in a direction perpendicular to the write direction.

FIG. 9 is a view for explaining the read and write operations of the buffer memories 8a and 8b.

When data are to be written in the first buffer memory 8a, data 1, 2, ..., n are sent from the final image processing circuit section 5-n for each column. Then, the rearrangement processing section 7 writes the data of the respective columns in the first buffer memory 8a, as shown in FIG. 9. That is, the data are written in the order of ①→②→③→④→ ....

Subsequently, the rearrangement processing section 7 reads out the data from the second buffer memory 8b. At this time, a row is used as a unit, unlike the write method. The rearrangement processing section 7 reads out the data of the respective rows from the second buffer memory 8b in the order of 1, 2, ..., m, as shown in FIG. 9. That is, the data are read out in the order of ①→②→③→④→....

Since the read and write functions of the first buffer memory 8a and second buffer memory 8b are sequentially switched and used, the read operation and write operation do not conflict.

In step S8, the rearrangement processing section 7 reads out the data in the different direction. After that, the rearrangement processing section 7 segments the data into MCU blocks and sequentially sends them to the JPEG processing section 6.

If NO in step S2, i.e., processing should be executed in the normal processing mode, processing in step S10 is executed. In step S10, the CPU 2 sets, in the image processing section 5, a normal processing instruction and parameter values necessary for the normal processing mode. In step S11, the CPU 2 reads out image data containing a single MCU block from the frame memory 4. The image data is transferred to the image processing section 5 together with excess data necessary only for image data processing.

In step S12, the image processing circuit sections 5-1, ..., 5-n at the respective stages process the transferred image data in accordance with the parameter values for the normal processing mode, which are indicated in advance. The rearrangement processing section 7 sends to the JPEG processing section 6 the image data processed by the final image processing circuit section 5-n without changing the order of image data. The rearrangement processing section 7 also sends the image data to the image display section 9 to cause it to display the image data.

For the rearrangement processing without changing the order, in, e.g., the normal processing mode, the final image processing circuit section 5-n and JPEG processing section 6 may be directly signal-connected by switching the circuits.

In step S13, the JPEG processing section 6 receives the data for each MCU block and compresses the data. In step s14, the JPEG processing section 6 transfers the compressed data to the frame memory 4.

As in this embodiment, when the rearrangement buffer 8 is added to the input side of the JPEG processing section 6, and data of each MCU block is supplied to the JPEG processing section 6 and image display section 9 in the same order as in normal processing, both the compression operation and the display operation can be made functional even in the high-speed processing mode.

FIG. 10 is a block diagram showing the arrangement of an image processing device according to the second embodiment of the present invention. In this embodiment, image processing circuit sections 5-1 to 5-n that constitute an image processing section 5 are expressed as functional blocks with explicitly illustrated detailed processing operations.

In this image processing device, a CPU 2 connected to a bus 1 causes a preprocess circuit section 3 to process an image sensing signal from a CCD image sensing element 30. The CPU 2 inputs the processed signal to the image processing section 5 through the bus 1. Note that a signal corresponding to a plurality of MCU blocks may be transferred, as described in the first embodiment.

Three primary color (R, G, and B) signals based on, e.g., a Bayer matrix are sequentially transferred from the CCD image sensing element 30 to the image processing section 5.

In the image processing section 5, a 3-color reconstruction processing section 5a registers the three chrominance signals to one pixel position, thereby executing 3-color reconstruction processing.

Next, a filter processing section 5b performs low-pass filter processing for the data that have undergone 3-color reconstruction processing. An interpolation processing section 5c at the subsequent stage executes resize processing to change the image size. The filter processing section 5b performs low-pass filter processing to prevent interference by high-frequency components generated in image data in resize processing.

The image-processed data are rearranged in a predetermined order through a rearrangement processing section 7 and rearrangement buffer 8, as in the first embodiment, and then sent to a JPEG processing section 6. The JPEG processing section 6 executes compression processing according to the JPEG scheme. The compressed image data is stored in a frame memory 4 through the bus 1 or recorded on a recording medium 32 such as a memory card through an interface 31.

The filter processing section 5b may process not only RGB data of a Bayer matrix but also color data by a complementary color system matrix. In this embodiment, the image is compressed using the JPEG scheme. However, the image may be compressed by a compression scheme other than JPEG.

The detailed arrangement of the image processing section 5 is not limited to the basic arrangement shown in this embodiment. Various processing functions may be added to the arrangement.

Operation of reading out the compressed data from the recording medium 32, expanding the data to the original image data, and reconstructing and displaying the image data on the image display section will be described next.

Figure 11:
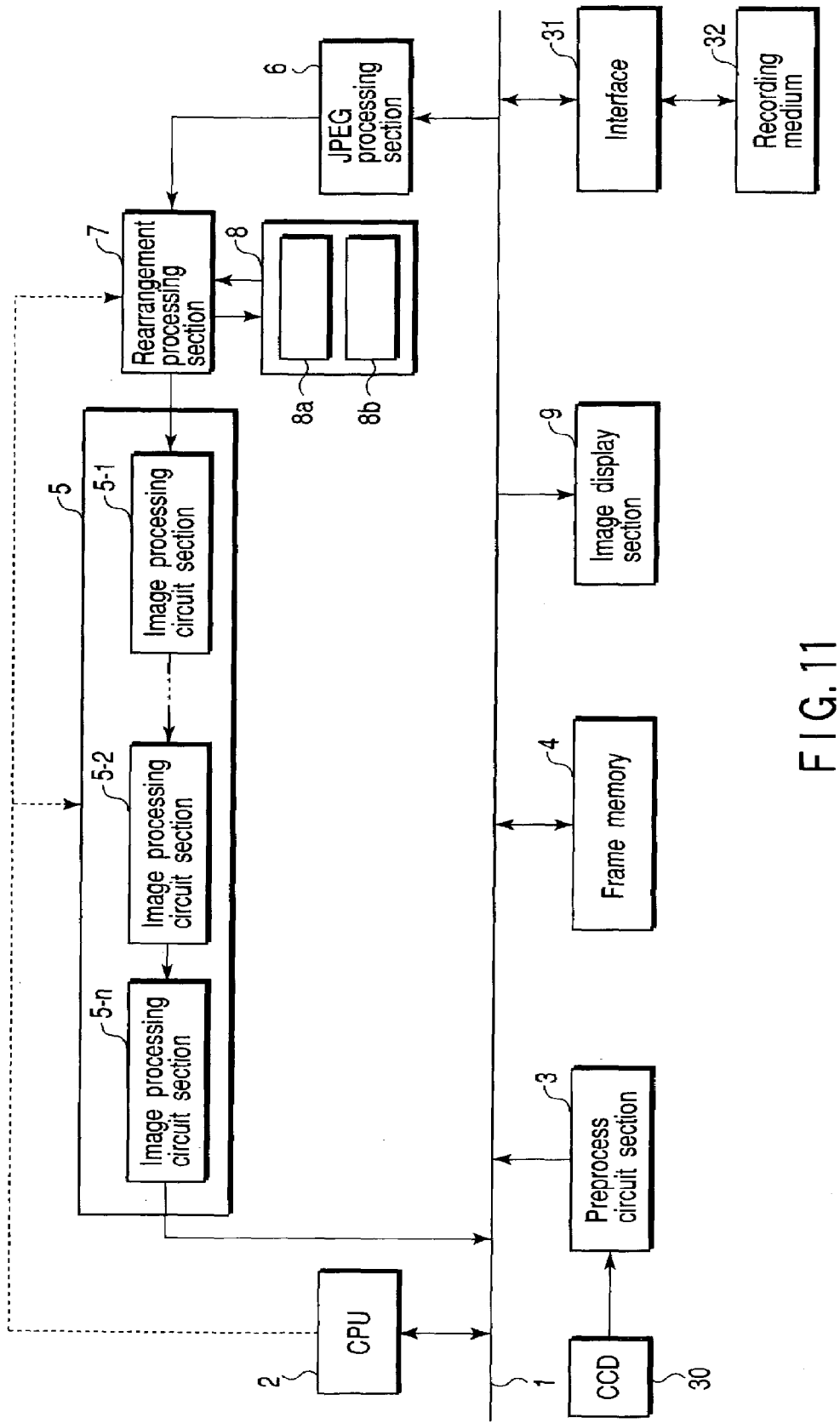
FIG. 11 is a view for explaining the expansion operation of the image processing device.

FIG. 11 is a view for explaining the expansion operation of the image processing device.

The image processing device shown in FIG. 11 has the same arrangement as in FIG. 6 except the direction of data flow. The processing order of the image processing circuit sections 5-1 to 5-n at the respective stages of the image processing section 5 is changed for expansion processing. Hence, the same reference numerals as in FIG. 6 denote the same parts in FIG. 11, and a detailed description thereof will be omitted.

Figure 12:
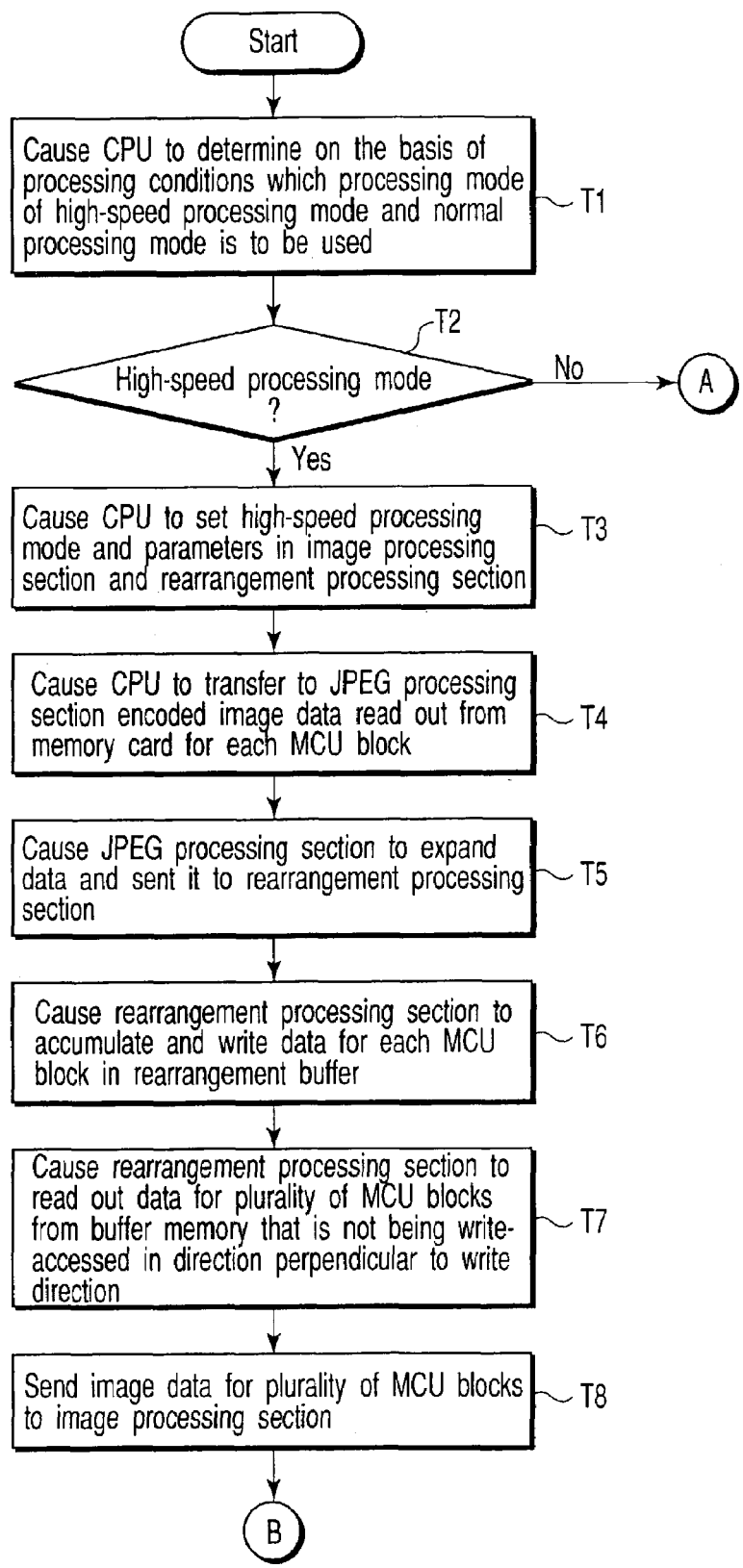
FIG. 12 is a flow chart showing the schematic procedure of image expansion by the image processing device.
Figure 13:
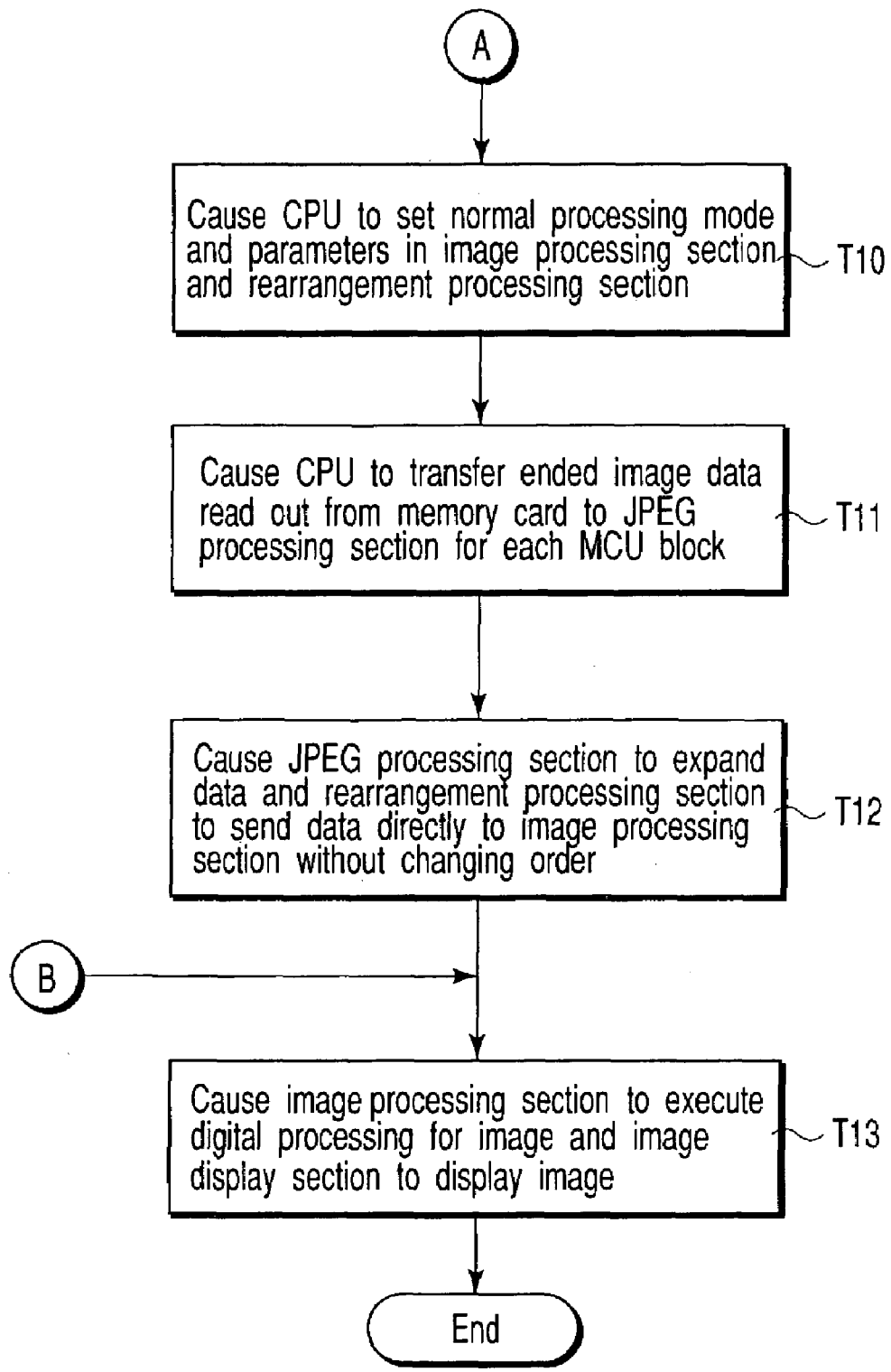
FIG. 13 is a flow chart showing the schematic procedure of image expansion by the image processing device.

FIGS. 12 and 13 are flow charts showing the schematic procedure of image expansion by the image processing device.

In step T1, on the basis of processing conditions including the size after expansion and the image processing time, the CPU 2 determines which scheme should be used for processing: the above-described scheme (to be referred to as a "high-speed processing mode" hereinafter) for transferring a plurality of MCU blocks or the scheme (to be referred to as a "normal processing mode" hereinafter) for sequentially transferring single MCU blocks.

If YES in step T2, i.e., processing should be executed in the high-speed processing mode, processing in step T3 is executed. In step T3, the CPU 2 sets, in the image processing section 5 and rearrangement processing section 7, a high-speed processing instruction and parameter values necessary for the high-speed processing mode. The parameters include, e.g., the number of MCU blocks to be transferred, the number of pixels to be transmitted, and the number of filter taps of the image processing circuit.

In step T4, the CPU 2 reads out encoded image data from the memory card for each MCU block and transfers the image data to the JPEG processing section 6. In step T5, the JPEG processing section 6 expands the image data and sends them to the rearrangement processing section 7 for each MCU block.

In step T6, the rearrangement processing section 7 accumulates and writes the data of each MCU block in memories 8a and 8b of the rearrangement buffer 8 until the data size reaches a predetermined size. In step T7, the rearrangement processing section 7 reads out the data written in the buffer memory 8b (8a) different from the write-accessed buffer memory 8a (8b) for a plurality of MCU blocks in a direction perpendicular to the write direction.

The read and write operations of the buffer memories 8a and 8b are the same as those described with reference to FIG. 9, and a detailed description thereof will be omitted.

In this way, the rearrangement processing section 7 reads out the data in the different direction. After that, in step T8 the rearrangement processing section 7 sequentially sends the data for a plurality of MCU blocks to the image processing section 5.

If NO in step T2, i.e., processing should be executed in the normal processing mode, processing in step T10 is executed. In step T10, the CPU 2 sets, in the image processing section 5 and rearrangement processing section 7, a normal processing instruction and parameter values necessary for the normal processing mode. In step T11, the CPU 2 transfers the encoded image data read out from the memory card to the JPEG processing section 6 for each MCU block.

In step T12, the JPEG processing section 6 expands the image data. The rearrangement processing section 7 sends the expanded data directly to the image processing section 5. For the operation of directly sending data, in, e.g., the normal processing mode, the JPEG signal processing section 6 and the image processing section 5 may be directly signal-connected by switching the circuits.

In step T13, upon receiving the expanded data, the image processing circuit sections 5-1, . . . , 5-n at the respective stages digitally process the received image data of each MCU block in accordance with the parameter values indicated by the CPU 2 in advance and causes the image display section 9 to display the image data.

In this way, when the rearrangement buffer 8 is added to the input side of the image processing section 5, and data received from the JPEG processing section 6 are supplied to the image processing section 5 all together, both the expansion operation and the display operation can be made functional even in the high-speed processing mode.

The arrangement of the device for expansion processing, which is shown in FIG. 11, is the same as that shown in FIG. 6 except the signal processing order. An image processing section which executes image processing used for the above-described compression processing and is unnecessary for expansion processing is not used by a bypass or the like. Hence, according to the arrangement of the present invention, both image compression and expansion processing can be executed at a high speed.

When image processing that is normally performed for each MCU is executed for a plurality of MCUs, the speed of image processing by the high-speed pipeline scheme can be further increased.

When the rearrangement buffer 8 is added to the input side of the JPEG processing section 6, and data of each MCU block is supplied to the JPEG processing section 6 and image display section 9 in the same order as in normal processing, both the compression operation and the display operation can be made functional even in the high-speed processing mode.

In addition, when the rearrangement buffer 8 is added to the input side of the image processing section 5, and only the signal processing order is changed to supply data received from the JPEG processing section 6 to the image processing section 5 all together, both the expansion operation and the display operation can be made functional even in the high-speed processing mode.

In the above embodiments, the present invention is applied to an image sensing device. However, the present invention is not limited to this example and can be widely applied to image processing devices having a function of executing processing using excess data such as spatial filtering processing. As an example of compression processing, JPEG processing has been described. However, the present invention is not limited to this example and can be widely applied to compression schemes using a repetitive approach scheme.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
an image processing part configured to process supplied image data;
an image compression part configured to compress image data, which is obtained by the image processing part;
a data supply part configured to sequentially supply the image data to the image processing part in a horizontal direction, the image data having a vertical data size defined by adding a size of peripheral data to an integer multiple of a vertical data size of a basic data size which is used as a basic unit data size in compression processing by the image compression part;
a setting part configured to set processing operations of the image processing part and image compression part, thereby processing corresponding to the image data having the size supplied from the data supply part is executed;
a storage part configured to store the image data, which is obtained by causing the image processing part to process the image data supplied by the data supply part in accordance with settings by the setting part; and
a sending part configured to read out the image data, which is stored in the storage part, for each basic data size and sequentially send the data to the image compression part.

2. A device according to claim 1, wherein
the data supply part comprises a selection part configured to alternatively select and supply image data formed from one of image data whose vertical data size is defined by adding the size of the peripheral data to the vertical size of the basic data size and the image data whose vertical data size is defined by adding the size of the peripheral data to the integer multiple of the vertical data size of the basic data size, and
the setting part sets the processing operations of the image processing part and image compression part, thereby processing corresponding to the image data having the data size selected by the selection part is executed.

3. A device according to claim 2, wherein the selection part alternatively selects the image data on the basis of a processing condition including at least one of an image data size condition and an image processing time condition.

4. A device according to claim 1, wherein the basic data size is a size of an MCU made of 8×16 or 16×16 pixel blocks.

5. A device according to claim 1, wherein the data size of the added peripheral data is a size necessary for the image processing part as preprocessing of image compression to input the basic data size to the image compression part.

6. A device according to claim 1, wherein the image processing part comprises a plurality of image processing modules including filter processing module or interpolation processing module.

7. An image processing device comprising:
an image expansion part configured to expand compressed image data;
an image processing part configured to process the expanded image data;
a storage part configured to receive image data having a basic data size as a data size expanded by the image expansion part and store a plurality of image data before supplying the image data to the image processing part;
a data supply part configured to read out, from the plurality of stored image data having the basic data size, image data having a vertical data size as an integer multiple of a vertical size of the basic data size and supply the image data to the image processing part; and
a setting part configured to set processing operations of the image processing part, thereby processing corresponding to the data size supplied from the data supply part is executed.

8. A device according to claim 7, wherein
the data supply part comprises a selection part configured to alternatively select and supply image data formed from one of image data whose vertical data size is defined by further adding peripheral data to the vertical size of the basic data size after expansion by the image expansion part and image data whose vertical data size is defined by further adding the peripheral data to the integer multiple of the vertical data size of the basic data size after expansion, and
the setting part sets processing operations of the image processing part and image compression part, thereby processing corresponding to the image data having the data size selected by the selection part is executed.

9. A device according to claim 8, wherein the selection part alternatively selects the image data on the basis of a processing condition including at least one of an image data size condition and an image processing time condition.

10. A device according to claim 7, wherein the basic data size after expansion is a size of an MCU made of 8×16 or 16×16 pixel blocks.

11. An image processing method comprising:
an image processing step of causing an image processing part to process supplied image data;
an image compression processing step of causing an image compression part to compress image data, which is obtained by the image processing part;
a data supply step of causing a data supply part to sequentially supply image data to the image processing part in a horizontal direction, the image data having a vertical data size defined by further adding peripheral data to an integer multiple of a vertical data size of a basic data size which is used as a basic unit data size in compression processing by the image compression part;
a setting step of causing a setting part to set processing operations of the image processing part and image compression part, thereby processing corresponding to the image data having the size supplied from the data supply part is executed;
a storage step of causing a storage part to store the image data, which is obtained by causing the image processing part to process the image data supplied by the data supply part in accordance with settings in the setting step; and
a sending step of causing a sending part to read out the image data, which is stored in the storage step, for each basic data size and sequentially send the data to the image compression part.

12. An image processing method comprising:
an image expansion step of causing an image expansion part to expand compressed image data;
an image processing step of causing an image processing part to process the expanded image data;
a storage step of causing a storage part to receive image data having a basic data size expanded in the image expansion step and store a plurality of image data before supplying the image data to the image processing part;
a data supply step of causing a data supply part to read out, from the plurality of stored image data having the basic data size, image data having a vertical data size as an integer multiple of a vertical size of the basic data size and supply the image data to the image processing part; and
a setting step of causing a setting part to set processing operations of the image processing part, thereby processing corresponding to the data size supplied from the data supply part is executed.

* * * * *